(12) United States Patent
Van Dalen et al.

(10) Patent No.: US 7,900,171 B2
(45) Date of Patent: *Mar. 1, 2011

(54) ELECTRONIC STREAM PROCESSING CIRCUIT WITH LOCALLY CONTROLLED PARAMETER UPDATES, AND METHOD OF DESIGNING SUCH A CIRCUIT

(75) Inventors: Edwin J. Van Dalen, Eindhoven (NL); Abraham J. De Bart, Beijing (CN); Paulus W. F. Gruijters, Best (NL)

(73) Assignee: NXP B.V., Eindhoven (NL)

( * ) Notice: Subject to any disclaimer, the term of this patent is extended or adjusted under 35 U.S.C. 154(b) by 33 days.

This patent is subject to a terminal disclaimer.

(21) Appl. No.: 12/256,334

(22) Filed: Oct. 22, 2008

(65) Prior Publication Data
US 2009/0306800 A1    Dec. 10, 2009

Related U.S. Application Data

(63) Continuation of application No. 10/597,992, filed as application No. PCT/IB2005/050439 on Feb. 2, 2005, now Pat. No. 7,458,039.

(30) Foreign Application Priority Data

Feb. 19, 2004   (EP) .................................. 04100654

(51) Int. Cl.
*G06F 17/50* (2006.01)
*G06F 15/78* (2006.01)

(52) U.S. Cl. ...................................... 716/100; 716/108

(58) Field of Classification Search ....................... None
See application file for complete search history.

(56) References Cited

PUBLICATIONS

Hasan et al., "A delay spread based low power reconfigurable FFT processor architecture for wireless receivers," 2003 Proceedings Int'l Symposium on System-on-Chip, p. 135-138.
Swanchara et al., "A methodical approach for stream-oriented configurable signal processing," 1999 Proceedings 32nd Annual Hawaii int'l Conference on System Sciences, pp. 3-4.
Zhang et al., "Architectural evaluation of flexible digital signal processing for wireless receivers," 2000 Record of 34th Asilomar Conference on Signals, Systems and Computers, pp. 78-83.
Mohebbi et al., "A case study of mapping a software-defined radio (SDR) application on a reconfigurable DSP core," 2003 IEEE, pp. 103-108.

*Primary Examiner*—Leigh Marie Garbowski

(57) ABSTRACT

A receiver circuit has a chain of stream processing circuits (10a-c)—having control parameter inputs for receiving control parameter values. To facilitate design of circuits that receive data with a variable block size, an included control circuit (14) selects block sizes of blocks of samples in the respective streams of a plurality of the stream processing circuits (10a-c), a control parameter value for each particular block. The control circuit transmits instructions specifying the selected block sizes and control parameter values to local control circuits (11). Each local control circuit is coupled to the control circuit (14) and the control input of a respective corresponding stream processing circuit (10a-c). Each local control circuit (11) receives at least part of the instructions and applies parameter values from the instructions to its corresponding stream processing circuit (10a-c). The local control circuit (11) controls timing of control parameter updates using block sizes from the instructions.

8 Claims, 2 Drawing Sheets

ELECTRONIC STREAM PROCESSING CIRCUIT WITH LOCALLY CONTROLLED PARAMETER UPDATES, AND METHOD OF DESIGNING SUCH A CIRCUIT

The invention relates to an electronic stream processing circuit and in particular to an integrated circuit that contains such an electronic stream processing circuit.

High throughput signal processing can be implemented using multiple stream processing circuits that operate in chain. Each stream processing circuit processes a respective input stream of successive sample values (time discrete signal values) and produces a respective output stream for use by another stream processing circuit, the stream processing circuit determining the successive output sample values in the output stream as a function of sample values from the input stream.

Most stream processing circuits typically have a specialized design, aimed at performing one or a limited number of functions with high efficiency. For example, there may be specialized stream processing circuits for performing Fourier transforms, for performing equalization (or filtering in general), for performing error correction, for performing demodulation, decompression interleaving etc. Typically the design of each type of stream processing is made once for application in many different integrated circuits. Usually, specialized circuitry is used, but for some functions the design may involve a general-purpose signal processor with a specialized program. Integrated circuit designers assemble an integrated circuit design from a library of such specialized designs. At this stage it is highly undesirable that the integrated circuit designer should have to modify the design of the specialized stream processing circuits.

Although specialized, the stream processing circuits in general are not wholly inflexible. In addition to their input and output for sample values from the streams, these specialized stream processing circuits may have a control input for applying control parameter values that affect processing all of the sample values during a time interval when the control parameter values are applied. Certain control parameters may be used to adapt the way in which these circuits perform their functions. For example a control parameter value may specify the block size of a Fourier transform or of an interleaving block, a control parameter may specify the precision of the sample values (the number of bits of each sample values that should be output), a demodulation scheme, a bandwidth etc. It is the task of the integrated circuit designer to ensure that the control parameter values required for the function of his or her integrated circuit are applied to the stream processing circuit in that integrated circuit.

In certain integrated circuits the control parameters values applied to the stream processing circuits have to change as a function of time. This may be the case for example in an integrated circuit that processes message frames in a communication system. Dependent on the position of a sample in a frame different processing may be needed. Different demodulation schemes may be needed for example, or different error correction mechanisms. Typically the control parameter values change on a block by block basis: the stream is considered to be segmented in successive blocks, each of successive samples and during processing of respective blocks respective control parameter values are applied to a stream processing circuit. Block sizes may be different for different stream processing circuits and due to processing latency the time points that separate successive blocks for different stream processing circuits generally do not coincide.

It is the task of the integrated circuit designer to include control circuitry for a specific application, to apply the appropriate control parameter values to the stream processing circuits at the appropriate times. Conventionally the integrated circuit contains a central control circuit, typically a micro controller, to control application of control parameter values, typically by writing control parameter values to registers from which they are applied to respective stream processing circuits. The central control circuit is programmed to monitor the progress of time to update the control parameter values for predetermined selected stream processing circuits at predetermined times during processing.

It has been found that this conventional design requires considerable overhead in the design of the central control processor. At certain times it may be necessary to update control parameter values of different stream processing circuits quickly after one another. This means that the central processor must have the capacity to handle many updates in short time intervals.

Furthermore, it has been found that the conventional design impedes product improvements wherein the design of an integrated circuit is changed by replacing one implementation of a stream processing circuit by another. When the new stream processing circuit has different timing properties this affects timing of changes of control parameter throughout the circuit, so that the central control circuit would have to be redesigned. In practice this exerts a pressure not to change stream processing circuits.

Among others, it is an object of the invention to provide for a technique that makes it possible to design electronic circuits with a chain of parameter controlled stream processing circuits, wherein the application of control parameters does not require a high capacity central processor.

Among others, it is an object of the invention to provide for a technique that makes it possible to design electronic circuits with a chain of parameter controlled stream processing circuits, wherein minimal further changes to the design of the circuit are needed when a new design is made wherein one or more of the parameter controlled stream processing circuits are replaced.

Among others, it is an object of the invention to provide for an electronic circuit that processes a stream of data using a chain of stream processing circuits in which no central control unit is needed to control timing of changes of control parameter values of stream processing circuits.

According to one aspect of the invention an application specific electronic circuit is designed using a library of pre-designed specialized stream processing circuit designs, incorporating selected ones of the stream processing circuits at selected positions along a stream processing chain, substantially without modifying the stream processing circuit designs. The electronic circuit is made application specific by adding local control circuits, each for a respective stream processing circuit that requires at least one variable control parameter value, and a common control circuit for supplying instructions to the local control circuits, the instructions specifying block sizes and parameter values. The local control circuits are used to control timing of control parameter updates. (A "library" as used herein is any collection of sub-circuit designs that can be incorporated into a different larger circuit designs without redesigning the designs from the library for each larger circuit design).

An electronic circuit according to the invention is set forth in Claim 4. According to the invention the control circuit for applying control parameter values to the stream processing circuits comprises a common control circuit and local control circuits. The common control circuit selects control parameter values and block sizes that determine the lengths of time intervals during which the parameter values apply to stream processing, before being replaced by new parameter values. The common control circuit transmits instructions to the local control circuits, the instructions specifying the selected parameter values and block sizes. The local control circuits take care of the timing of parameter value updates, by counting off a length of time according to the block size from a previous update.

Preferably, the stream processing circuits are arranged to indicate clock cycles in which they output new sample values and the local control circuit count off the length of time by counting the number of new samples. As a result, the control circuit need not be changed when a stream circuit is changed in such a way that the output timing of sample values changes.

Preferably the local control circuits contain a sample delay circuit, so that it is possible to trigger the control parameter update upon reception of the first new sample value in a block before that first new sample value is applied to a stream processing circuit. Thus, time is available to ensure that the update of the control parameters for a block coincides with the first sample value of the block or even precedes the first sample by a predetermined number of clock cycles.

Preferably, the local control circuits contain multi-place FIFO buffers for items of instruction information from the common control circuit. Typically, each item comprises a block size specification and a parameter value specification, the block size specification of the item determining how long it takes before the specified parameter value of the item must be updated. The items are used in turn from the FIFO buffer. By using a FIFO buffer it is possible to relax the requirements on the speed at which the common control circuit must supply instructions, because instructions can be supplied in slack time intervals, wherein little or no parameter value updates occur at the stream processing circuits, for later local use.

These and other objects and advantageous aspects of the invention will be described by means of non-limitative examples using the following figures FIG. 1 shows a network of stream processing circuits;

Figure 4:
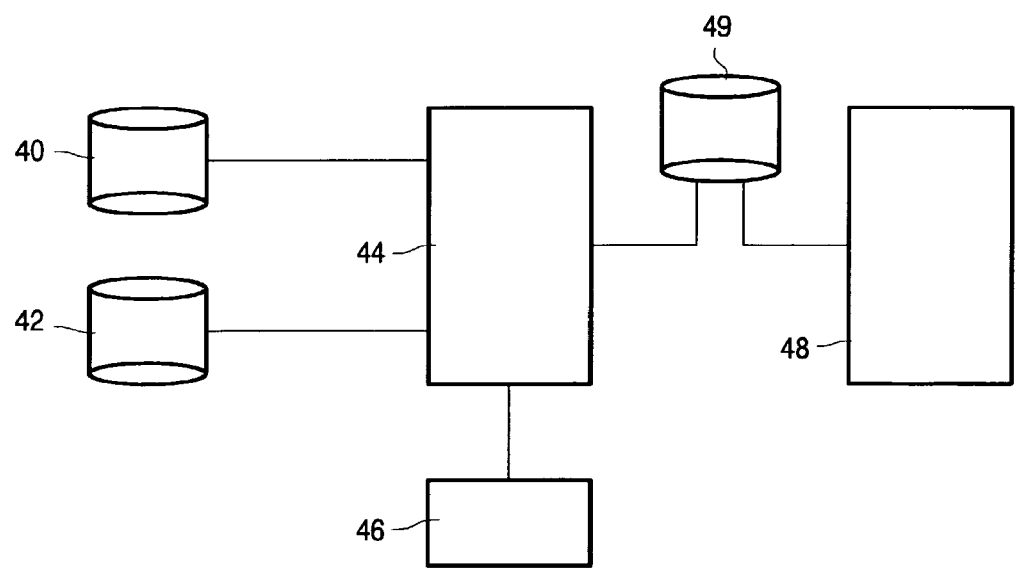

FIG. 4 schematically shows a system for manufacturing IC's.

Figure 1:
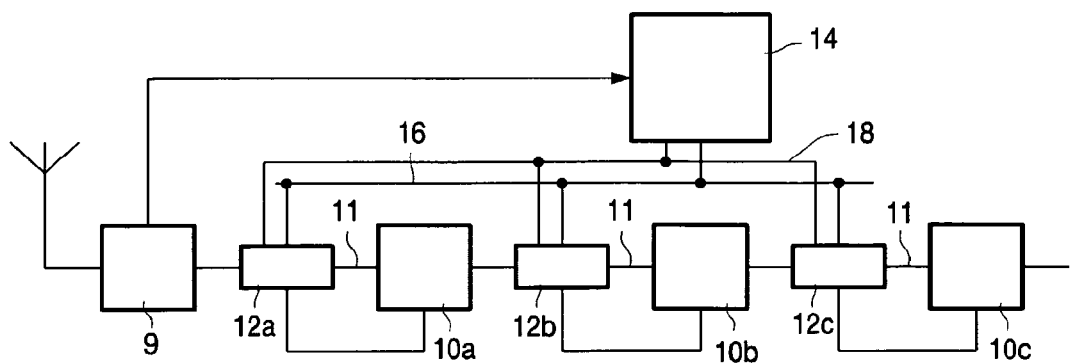

FIG. 1 shows an electronic circuit with a receiving circuit 9, a central control processor 14, a bus 16 and a network of stream processing circuits 10*a-c* and local control circuits 12*a-c*. A simple chain is shown as an example of a network, but it will be realized that more complex networks, containing multiple interconnected chains may be used as well. Stream processing circuits 10*a-c* have stream inputs and outputs and control parameter inputs. In the chain the stream processing circuits 10*a-c* and local control circuits 12*a-c* are organized as units that each contain a local control circuit 12*a-c* coupled to a corresponding stream processing circuit via an output 11 for supplying successive sample values from a stream and via a further output for supplying control parameter values. The stream output of the stream processing circuit 10*a-c* of each unit (except the final unit) is coupled to an input of the local control circuit 12*a-c* of the next unit. Receiving circuit 9 is coupled to the input of the chain and to central processing circuit. Central control processor 14 is coupled to the local control circuits 12*a-c* via bus 16 and optionally via a common reset connection 18.

By way of example the invention will be illustrated using a reception system with receiving circuit 9, but it should be understood that the invention is not limited to such reception systems. In operation receiving circuit 9 processes a communication signal that contains modulated information representing frames of information. The frames typically contain header information and data which is modulated onto the communication signal in a way specified by the header information. Receiving circuit 9 detects the start of a frame and determines the content of the header information. Receiving circuit 9 also samples the communication signal (or more precisely by sampling a signal obtained by processing the communication signal) and outputs resulting sample values sequentially.

These sample values are processed by stream processing circuits 10*a-c*, wherein the samples may be treated differently, dependent on the position of the sample (time point for which the sample is obtained) relative to the start of the frame and optionally dependent on information from the header.

Receiving circuit 9 signals information about the time point of the start of the frame and information about the header to central control processor 14. The information about the time point of the start of the frame identifies a first sample at the start of a frame cycle of samples for the frame that must be processed by the stream processing circuits 10*a-c*. The first stream processing circuit 10*a* uses these samples as inputs for performing functions. First stream processing circuit 10*a* produces output samples and outputs them sequentially for use by second stream processing circuit 10*b*, which performs other functions and so on.

The functions of the different stream processing circuits 10*a-c* include for example performing a Fourier transform of a block of samples, equalization, demapping data bits from samples, interleaving samples, performing error correction etc. Many of these functions use blocks of samples, different functions using differently sized blocks. For example, the block from which a Fourier transform is obtained may be 64 samples long and an interleaving block may consist of a different number of samples.

The control parameters of the functions (such as block sizes) may be different for different blocks as a function of time, e.g. for blocks that correspond to different positions in a frame. For example, a bandwidth parameter of a feedback loop in a stream processing circuit 10*a-d* may be reduced as the position in the frame progresses, or for certain blocks a parameter describing the number of significant bits per sample in a block may be adjusted as a function of position of the block in frame. Central control processor 14 uses local control circuits 12*a-c* to control when the control parameters of the stream processing circuits are changed.

In operation central control processor 14 sends instructions to local processing circuits 12*a-c* via bus 16. Each instruction is directed at a particular local processing circuit 12*a-c* and specifies a one or more control parameter values that this local processing circuit 12*a-c* has to apply to its corresponding stream processing circuit 10*a-c* during processing of a block of data. The instruction also specifies a block size that defines a number of samples in the block of data.

Each local control circuit 11 applies a control parameter to its corresponding stream processing circuit from the start of arrival of samples of a block. Local processing circuit 12*a-c* determines when blocks start by counting the number of samples that arrive at its input. When the count indicates that a number of samples corresponding to the block size has arrived, the local control circuit 11 updates the control parameters that it applies to its corresponding stream processing circuit before the time, or preferably substantially at the same time, when the first sample of the next is applied to the corresponding stream processing circuit 10*a-c*.

The local control circuit 12*a-c* uses a received instruction from central control processor 14 to derive the control parameters local control circuit 12a-c that will applied and when. Together with the change of the control parameter the local control circuit 12a-c restarts counting to trigger a next update of the control parameters when the number of samples defined by the block size from this received instruction has arrived. In an embodiment central control processor 14 or receiving circuit 9 also supplies a reset signal, to mark the starting time point of processing of a frame, to all local control circuits, in order to reset the counts of the number of samples and to load the first available control parameters.

Figure 2:
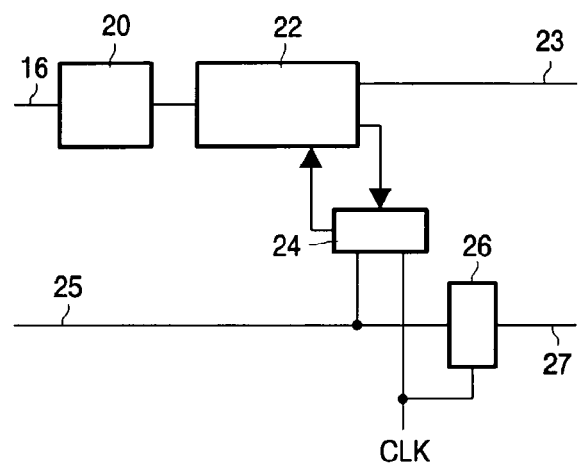
FIG. 2 shows a local control circuit.

FIG. 2 shows an embodiment of a local control circuit. The control circuit contains a bus receiver 20, an instruction buffer 22, a counter 24 and a sample buffer 26. Bus receiver has an interface coupled to bus 16 and an output coupled to instruction buffer 22. Instruction buffer has an output 23 for supplying parameters to a stream processing circuit (not shown) and an output coupled to counter 24 for supplying block size information. Counter 24 has a count input coupled to an input 25 for a stream of samples, as well as a clock input CLK. Sample buffer 26 has an input coupled to input 25 for a stream of samples and an output for outputting the stream of samples to the stream processing circuit (not shown).

In operation bus receiver 20 receives instructions from central control processor 14 (not shown) via bus 16. Each instruction contains one or more control parameters and a block size. Bus receiver 20 writes data from the received instructions to instruction buffer 22. Each instruction holds for a respective block of samples that arrive at input 25. When samples from the block arrive at input 25 instruction buffer 22 applies the control parameters from the instruction at control parameter output 23 (optionally of course a parameter register and/or an instruction decoder may be used between instruction buffer 22 and the stream processing circuit). The block size from the instruction is loaded into counter 24 at the start of the block. Counter 24 counts down each time when a sample from the block arrives at input 25 and when counter 24 reaches zero it triggers instruction buffer 22 to supply the control parameters and block size from a next instruction.

Preferably, the circuit operates in sample cycles marked by a clock signal at clock input CLK. It should be realized that it is not necessary that a new sample arrives at the inputs of local control circuits 12a-c in each sample cycle. New samples may arrive for example every n sample cycles (n=2, 3 . . . ) in irregular sample cycles. This depends on the processing function performed by the stream processing circuit 10a,b that supplies the samples (and/or on receiving circuit 9). In an embodiment, the sample data supplied by at least some stream processing circuits 10a-b contain information to indicate whether a valid sample is supplied in a sample cycle signaled at clock input CLK, e.g. in the form of a "valid" bit that accompanies the sample at input 25.

Sample buffer 26 buffers the samples, typically for one cycle of clock signal CLK. Preferably the samples are replaced in sample buffer 26 only in response to a signal that a new sample has arrived (but of course if the sample is repeated at input 25 a sample may be copied each cycle).

Counter 24 is arranged to decrease the count value only in sample cycles of clock CLK where the stream processing circuit 10a,b that supplies the sample (or receiving circuit 9) indicates supply of a new sample. Consequently, the update of the parameter value from instruction buffer 22 is triggered in response to cycles wherein a valid sample is supplied. Preferably counter 24 is arranged so that the update of the control parameter value occurs upon receiving the first sample of a new block. Sample buffer 26 buffers the sample values, typically for one cycle of clock signal CLK. As a result local control circuit 12a-c has time to trigger the control parameter value update in the sample cycle before the first sample value of the new block is supplied to stream processing circuit 10a-c, i.e. when sample buffer 26 still supplies the last sample, if any, from the previous block to the corresponding stream processing circuit 10a-c. Thus, the updated control parameter value are first supplied to stream processing circuit 10a-c together with the first sample of the new block. When sample buffer 26 provides for a larger delay, the update of the control parameter value can even be realized a predetermined number of sample cycles before the first new sample value from the block is applied.

Although the invention has been described in terms of a down counter, which is set by the block size data from the instruction, it will be understood that a comparator may also be used to compare a count value in counter 24 with the block size data from instruction register 22, the comparator triggering the parameter update. In this case any type of counter may be used.

Although sample counting in counter 24 has been described assuming that stream processing circuits 10a-d produce information to indicate whether a valid sample is supplied, it will be understood that other ways of controlling counting may be used. For example, instructions could specify the total number of sample cycles in a block (if a new sample is not supplied in each sample cycle). In this case, counter 24 may count all sample cycles until the specified total number of sample cycles has occurred and then trigger update of the control parameter value. In this case, sample buffer 26 may not be needed. More complicated ways of specifying the total number of clock cycles may be used in the instructions, e.g. by also specifying the number of clock cycles between samples. However, counting samples rather than sample cycles, and using identifications of new samples from stream processing circuits, has the advantage that a minimum of redesign will be needed when a new type of electronic circuit is designed in which one or more of the stream processing circuits are replaced.

Although a respective single stream processing circuit 10a-c is shown to follow each local control circuit 12a-c respectively, it will be understood that any one or more of stream processing circuits 10a-c may in fact be comprised of a plurality of smaller stream processing circuits arranged in a sub-chain. Each, or at least part of these smaller stream processing circuits, receiving at least one control parameter from the local control circuit 12a-c that precedes the stream processing circuit 10a-c that contains the smaller stream processing circuits. This may be used for example when all smaller stream processing circuits in the sub-chain always use the same block size, so that they always make corresponding control parameter values changes.

Optionally a control parameter delay buffer may be provided for part of such smaller stream processing circuits. Such a buffer may delay application of new control parameters relative to the application of new control parameters to other ones of the smaller stream processing circuits. In this case the delays are chosen corresponding to respective delays between the arrival of a first sample of a block at the input of the sub-chain and the arrival of the first samples of resulting blocks at the inputs of respective smaller stream processing circuits.

Preferably, instruction buffer 22 is a FIFO buffer that outputs control parameter values and block size data from instructions in the order of arrival of instructions from bus 16. Without deviating from the invention, however, a buffer with storage only for a single, last received instruction may be used. When counter 24 indicates that a new instruction is needed the instruction is read from the instruction buffer and the count value and the control parameters are set according to the instruction (the latter e.g. by loading into a control parameter register (not shown)). Of course, this requires central control processor 14 to supply instructions before all samples of the block controlled by a previous instruction have arrived. The FIFO buffer relaxes this requirement. Instead of FIFO buffering, other types of buffering may be used, for example by using an instruction sequence number field in the instruction to control the order in which instructions will be used to provide control parameters and block size data.

At the start of a frame it may be necessary to arrange for initialization. Preferably central processing circuit 14 or receiving circuit 9 supplies a reset signal to local control circuits 12a-d to mark a sample cycle wherein receiving circuit 9 supplies a sample value that corresponds to a predefined position in a frame, typically the first useful sample value. With increasing delay after supply of this first useful sample value the stream processing circuits 10a-c will start producing valid new sample values. Preferably stream processing circuits 10a-b do not indicate that valid samples are output until they output the first sample values that are determined as a function of derived from sample values at or after the marked position in the frame.

In this case local control circuits 12a-d preferably reset their counters 24 in response to the reset signal, the counters 24 being reset to a value (e.g. 1) so that the control parameters from a first received instruction will be supplied to the corresponding stream processing circuit 10a-c when a first valid new sample value reaches the stream processing circuit 10a-c. Before that time control circuits 12a-c preferably apply disabling parameter values to their corresponding stream processing circuits 10a-c.

As an optional alternative, the control parameter value from a first received instruction may be supplied to the corresponding stream processing circuit 10a-c immediately in response to the reset, or after a predetermined number of clock cycles, if the stream processing circuits 10a-c are arranged to suspend operation until reception of a first new sample. If stream processing circuit 10a-c are of a type that output useless samples before samples derived from the first block in a frame have arrived, local control circuit preferably count these useless samples before applying the first relevant control parameters to their corresponding stream processing circuit 10a-c. In this case central control processor 14 preferably supplies initial instructions to local control circuits 12a-c, that specify a count of samples that must have arrived before the first relevant control parameters must be applied.

Figure 3:
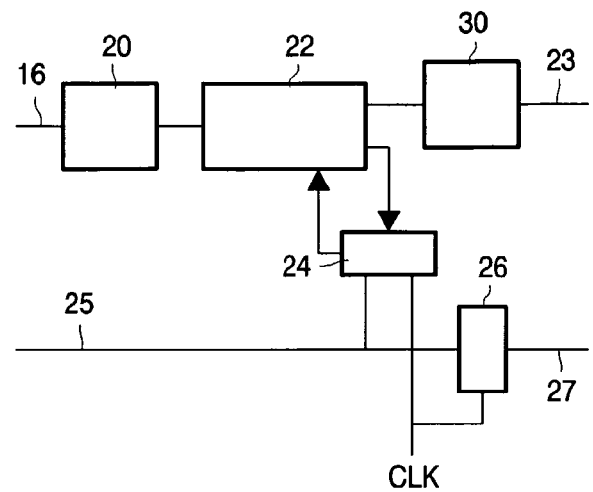
FIG. 3 shows a set of control circuits.

FIG. 3 shows an alternative embodiment of a local control circuit. In this circuit a look-up table memory 30 has been added between the output of instruction buffer 22 and control parameter output 23. In operation, look-up table memory 30 contains respective control parameter values at respective addressable storage location. Each instruction in instruction buffer 22 contains an address of one of these control parameter values (or other information that identifies an address). When an instruction is output from instruction buffer 22, an identified address is supplied to an address input of look-up table memory 30, which outputs the addressed set of control parameters in response. In this way, instructions can be kept short, conserving bandwidth on bus 15. The control parameter values may be stored in look-up table memory 30 by central control processor 14 via any suitable interface (not shown) e.g. using bus 15, but the sets may also be set during manufacture of the electronic circuit, for example by using a ROM to implement look-up table memory 30.

In a typical application the stream processing circuits include a Fourier transform processor, an equalizer, a demodulator, an interleaver and an error correction circuit. In this application receiving circuit 9 amplifies, downconverts a communication signal and samples the downconverted signal. Receiving circuit 9 outputs a new sample of the downconverted signal once every n (n=4 for example) sample cycles.

A first stream processor is an FFT processor which receives blocks of m (m=64 for example) sample values, computes an FFT of each block and outputs Fourier coefficients each as a respective sample value. A second stream processor is an equalization processor, which equalizes the Fourier coefficients (e.g. applies frequency dependent factors). Typically the block size of this stream processing circuit corresponds to the number of Fourier coefficients that the FFT processor outputs for each input block. The equalization parameters remain constant within a block, but may be changed between successive blocks. This could be done by applying the equalization parameters as control parameters from instructions, to the equalization processor, but alternatively the equalization processor may have an internal feedback loop for doing so, in which case the control parameters from the instructions may determine the bandwidth of the feedback loop, the bandwidth being set at an initial value at the start of the frame and at increasingly narrow values as the frame progresses.

The equalization processor outputs equalized samples. A demodulation stream processor derives demodulated bits from the equalized samples and outputs these bits. Control parameters from the instructions control the form of modulation, which may changed within the frame, possibly even dependent on information from the header, which is supplied from receiving circuit 9 to central control processor 14 to control generation of the instructions.

The demodulation stream processor produces sample values with demodulated data. The number of significant bits per sample value may be different in different blocks, or data demodulated from different input sample values may be combined into output samples. An interleaver and/or error correction stream processor processes the output sample values from the demodulation stream processor, in blocks of a size that generally differs from the block size of the Fourier transform processor etc. The block size may change dependent on the position of the block from the start of the frame. Central control circuit controls the block size by means of instructions supplied to the local control circuits.

As will be appreciated design of the circuit of FIG. 1 facilitates modular design of integrated circuits. FIG. 4 schematically shows a system for manufacturing IC's. A first storage medium 40 contains a library of design data of stream processing circuits for various specialized functions. A second storage medium 42 (or first storage medium 40) contains design data for local control circuits 12a-d and central control processor 14. A design computer 44 is controlled from a designer interface terminal 46. From this terminal the designer selects a plurality of different stream processing circuits and commands computer 44 to generate a design with a chain of selected stream processing circuits. The designer also specifies the control parameter values that must be applied to the different stream processing circuits for different blocks as a function of the block sequence number, if necessary the designer also specifies block sizes.

Design computer 44 reads the design data of the selected stream processing circuits from first storage medium 40 and uses this design data substantially as is to generate an integrated circuit design (optionally by reference). Design computer 44 adds design data of a central control processor, and copies of local control processor design data for each selected stream processing circuit (or sub-chain of selected stream processing circuits, if the block sizes used by these stream processing circuits are always equal). Next design computer 44 generates a program for central control processor 14 to generate instructions that specify the parameters and block sizes selected by the designer and send those instructions to the relevant local control circuits. Design computer 44 stores the resulting integrated circuit design in a third storage medium 49 (which may be the first and/or second storage medium). An IC manufacturing system 48 may use the integrated circuit design data to manufacture integrated circuits according to the integrated design data.

If at a later time the integrated circuit design is changed by replacing one or more of the implementations of the stream processing circuits, design computer 44 reads back the integrated circuit design data and replaces the design data of the relevant stream processing circuits (or the references thereto). No change to the timing of control parameter updates is needed.

The invention claimed is:

1. A method for use in the manufacture of an integrated circuit, the method comprising:
   providing a library of pre-designed specialized stream processing circuit design data;
   generating integrated circuit design data of an integrated circuit that incorporates selected ones of the stream processing circuits at selected positions along a stream processing chain in an integrated circuit;
   adding local control circuits to the integrated circuit design, each coupled to a control parameter input of a respective stream processing circuit that requires at least one variable control parameter value, the local control circuits being arranged to control timing of control parameter updates by counting off block size dependent time intervals between times points of successive control parameter updates;
   adding a common control circuit to the integrated circuit design, for supplying instructions to the local control circuit, the instructions specifying block sizes and parameter values; and
   manufacturing an integrated circuit according to the integrated circuit design data.

2. A method according to claim 1, wherein at least one of the local control circuits has outputs coupled to control parameter inputs of a plurality of stream processing circuits that operate using mutually common block sizes, the at least one of the local control circuits timing updates of the control parameters of the plurality of stream processing circuits in common.

3. An electronic circuit, comprising:
   a chain of stream processing circuit, at least part of the stream processing circuits having a control parameter input for receiving control parameter values;
   a common control circuit to select a control parameter value for each particular block and to transmit instructions specifying the selected block sizes and control parameter values;
   a plurality of local control circuits being arranged to receive at least part of the instructions and to apply parameter values from the instructions to its corresponding stream processing circuit, the particular local control circuit controlling timing of control parameter updates using block sizes from the instructions by counting off block size dependent time intervals between times points of successive control parameter updates.

4. An electronic circuit according to claim 3 operative in periodic sample cycles, wherein the stream processing circuits are arranged to indicate in which of the sample cycles new samples are produced, each particular local control circuit comprising a respective counter that determines a count representative of a number of new sample values that have been indicated since the preceding one of the time points for input to its corresponding stream processing circuit, the local control circuit being arranged to trigger an update of the control parameters when said count represents a block size specified in an instruction from the common control circuit.

5. An electronic circuit according to claim 4, wherein the local control circuit comprises a sample buffer between its corresponding stream processing circuit and a supply source of input samples for the corresponding stream processing circuit, said counter counting new sample values at an input of the sample buffer, the sample buffer delaying supply of new samples to the corresponding stream processing circuit by at least one processing cycle with respect to a processing cycle in which the new sample values are used to update the count.

6. An electronic circuit according to claim 4, wherein at least one of the local control circuits comprises a FIFO instruction buffer arranged to buffer items of instruction information received from the common control circuit, each item comprising a control parameter value specification and a block size specification, said at least one of the local control circuits being arranged to apply the control parameter values specified by successive items from the FIFO instruction buffer successively to its corresponding stream processing circuit the time interval after which the control parameter value of the item is replaced by an update being selected by counting off the length of a time interval specified by the block size specified by the item.

7. An electronic circuit according to claim 4, wherein at least one of the local control circuits comprises a look-up table memory for storing a plurality of control parameters values for its corresponding stream processing circuit, the look-up table memory having a stored data output coupled to the control parameter input of the corresponding stream processing circuit of the at least one of the local control circuits, the instructions from the common control circuit containing identifications of addresses in the look-up table memory, the at least one of the local control circuits addressing the look-up table memory using the identifications.

8. An electronic circuit according to claim 4, comprising a receiver circuit for receiving frames of a communication signal, the receiver circuit comprising a detector for detecting starting points of frames, the receiver circuit being arranged to generate an input stream of sample values for the chain, and reset signals each in a predetermined time relation to a respective one of the starting points, the reset signals being fed to the local control circuits, the local control circuits resetting the counts in response to the reset signal.

\* \* \* \* \*